Patented Dec. 26, 1922.

1,440,037

UNITED STATES PATENT OFFICE.

KARL THIESS, OF SINDLINGEN, NEAR HOCHST-ON-THE-MAIN, AND FRANZ GILOY, OF HOCHST-ON-THE-MAIN, GERMANY, ASSIGNORS TO FARBWERKE VORM. MEISTER LUCIUS & BRÜNING, OF HOCHST-ON-THE-MAIN, GERMANY, A CORPORATION OF GERMANY.

MANUFACTURE OF STABLE, DRY, AND READILY-SOLUBLE VAT PREPARATIONS FOR DYEING.

No Drawing. Application filed March 17, 1922. Serial No. 544,657.

*To all whom it may concern:*

Be it known that we, KARL THIESS and FRANZ GILOY, citizens of Germany, residing at (1) Sindlingen, near Hochst-on-the-Main, Germany, (2) at Hochst-on-the-Main, Konigsteinerstrasse 2, Germany, have invented certain new and useful Improvements in the Manufacture of Stable, Dry, and Readily-Soluble Vat Preparations for Dyeing, of which the following is a specification.

In the American application No. 494,714 filed 23, 8, 21 is described a process for the manufacture of stable, dry and readily soluble vat-preparations from quinone vat-dye-stuffs dyeing wool an indigo by evaporating to dryness, preferably in a vacuum, leuco-alcali salt of quinone vat-dyestuffs dyeing wool together with an alkali salt of leuco-indigo, with or without the addition of agglutinating or diluting agents.

An improvement or modification of the foregoing process with the same result consists in replacing the alkali salts of leuco-indigo by such of halogen-indigos, as far as the latter can still be regarded as vat-dyestuffs dyeing wool.

The following examples illustrate the invention:

1. A paste prepared from 250 kilos of monobrom-indigo-white and 100 kilos of the reduced brown sulphurous quinone vat-dyestuff, obtainable for instance according to U. S. Patent 1,128,368 of 16:2.1915 is dissolved in a mixture of 300 kilos of caustic soda lye of 40° Baumé and 300 kilos of water. 150 kilos of molasses (50 per cent strength) and 10 kilos of hydrosulphite are added and the mass then evaporated to dryness, first under stirring and in a high vacuum and later, as soon as the mass has become rather thick, in flat cups in a vacuum box. The vat-preparation thus obtained shows a dark lustre and can be easily dissolved in water to a vat ready for use, which dyes wool in fine reddish-black tints.

2. If the quinone vat-dyestuff in example 1 from the U. S. Patent 1,128,368 is substituted by the sulphurous vat-dyestuff obtained from m.m¹-dinitrodiarylidodichlor-quinone and ammonium sulphide (comp. U. S. Patent 1,128,368) a vat preparation is obtained which, dissolved in water, dyes wool in blackish-blue tints.

3. 175 kilos of monobromindigo-white and 175 kilos of the reduced yellow quinone vat-dyestuff, obtainable from quinone and p-chloraniline, are dissolved in a mixture of 280 kilos of caustic soda lye of 40° Baumé and 280 kilos of water. To this solution are added 175 kilos of molasses (50 per cent strength) and 10 kilos of hydrosulphite and the mixture then evaporated to dryness in a high vacuum until it has become thick. The mass is finally completely evaporated to dryness in flat cups in a vacuum box. The vat-preparation thus obtained shows a greenish-black and lustrous aspect, is readily soluble in water and dyes wool green.

If the brown dyestuff in Examples 1 and 2 or the yellow dyeing para-para¹-dichlor-dianilidoquinone in Example 3 is substituted by the olive-dyestuff, described in specifications of the U. S. Patent 1,151,628 and German Patent 282,501, dry and solid vat-preparations are obtained which dye wool in the corresponding mixed tints. Instead of monobromindigo may be used monochlor-indigo or dibromindigo.

Claims.

1. As a new process, the herein described manufacture of stable, dry and readily soluble vat-preparations from quinone vat-dyestuffs for wool and halogen-indigos, which comprises evaporating to dryness, an aqueous mixture of an alkali leuco-salt of the quinone vat-dyestuff and an alkali salt of leuco halogen-indigo.

2. As a new process, the herein described manufacture of stable, dry and readily soluble vat-preparations from quinone vat-dyestuffs for wool and halogen-indigos, which comprises evaporating to dryness in a vacuum an aqueous mixture of an alkali leuco-salt of the quinone vat-dyestuff and an alkali salt of leuco halogen-indigo.

3. As a new process, the herein described manufacture of stable, dry and readily soluble vat preparations from quinone vat-dyestuffs for wool and halogen-indigos, which comprises evaporating to dryness, an aqueous mixture of an alkali leuco-salt of the quinone vat-dyestuffs and an alkali salt of leuco halogen-indigo and an agglutinating or diluting agent.

4. As a new process, the herein described manufacture of stable, dry and readily soluble vat preparations from quinone vat-dyestuffs for wool and halogen-indigos, which comprises evaporating to dryness in a vacuum an aqueous mixture of an alkali leuco-salt of the quinone vat-dyestuffs and an alkali salt of leuco halogen-indigo and an agglutinating or diluting agent.

5. As new products, vat preparations from quinone vat dyestuffs dyeing wool and halogen-indigos, which preparations contain an alkali leuco-salt of said quinone vat-dyestuffs together with an alkali salt of leuco halogen-indigo and are stable, dry and readily soluble.

6. As new products, vat preparations from quinone vat dyestuffs dyeing wool and halogen-indigos, which preparations contain an alkali leuco-salt of said quinone vat-dyestuffs together with an alkali salt of leuco halogen-indigo and an agglutinating or diluting agent, which are stable, dry and readily soluble.

In testimony whereof, we affix our signatures.

KARL THIESS.
FRANZ GILOY.

Witnesses:
HERMANN WAGNER,
FOERST HOLZAPFEL.